US012643476B2

(12) United States Patent (10) Patent No.: US 12,643,476 B2
Hatzakis et al. (45) Date of Patent: Jun. 2, 2026

(54) CONTROL SYSTEM AND METHOD

(71) Applicant: JAGUAR LAND ROVER LIMITED, Whitley (GB)

(72) Inventors: John Hatzakis, Coventry (GB); Anand Govindankutty, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 188 days.

(21) Appl. No.: 17/640,021

(22) PCT Filed: Aug. 27, 2020

(86) PCT No.: PCT/EP2020/073972
    § 371 (c)(1),
    (2) Date: Mar. 3, 2022

(87) PCT Pub. No.: WO2021/043665
    PCT Pub. Date: Mar. 11, 2021

(65) Prior Publication Data
    US 2022/0297601 A1     Sep. 22, 2022

(30) Foreign Application Priority Data
    Sep. 3, 2019    (GB) ..................................... 1912628

(51) Int. Cl.
    *B60R 1/28*        (2022.01)
    *B60R 1/00*        (2022.01)
    (Continued)

(52) U.S. Cl.
    CPC ............... *B60R 1/28* (2022.01); *B60R 1/003* (2013.01); *B60R 1/25* (2022.01); *B60R 1/26* (2022.01);
    (Continued)

(58) Field of Classification Search
    None
    See application file for complete search history.

(56) References Cited

U.S. PATENT DOCUMENTS 6,690,413 B1 *  2/2004  Moore ...................... B60R 1/28
                                                        348/E7.086
    7,425,889 B2 *  9/2008  Widmann ............... B60R 1/003
                                                        340/425.5
                        (Continued)

FOREIGN PATENT DOCUMENTS

DE       102018201027 A1    7/2019
    GB           2515800 A      1/2015
    GB           2541906 A      3/2017

OTHER PUBLICATIONS

Combined Search and Examination report corresponding to Great Britain Application No. GB1912628.3, May 15, 2020, 8 pages.
                        (Continued)

*Primary Examiner* — Hung Q Dang
    (74) *Attorney, Agent, or Firm* — McCoy Russell LLP

(57) ABSTRACT

The present invention relates to a control system (1) for providing assistance to an occupant of a vehicle (V1). The control system (1) is configured to receive hitch angle data indicative of a hitch angle ($\alpha$) of a towed vehicle (V2) coupled to the towing vehicle (V1). The control system (1) selects first and second image data subsets of at least first image data (DIMG1). The first image data subset represents a first viewport (VPL, VPR) on a first side of the towing vehicle (V1) and the second image data subset representing a second viewport (VPL, VPR) on a second side of the towing vehicle (V1). A signal (SOUT1) indicative of the first image data subset and the second image data subset is output to at least one display (5) for displaying the first viewport (VPL, VPR) and the second viewport (VPL, VPR) to the occupant of the towing vehicle (V1). The control system (1)
                        (Continued)

is configured to select the first image data subset and the second image data subset in dependence on the hitch angle data. The first image data subset is selected to increase the prominence of the first viewport (VPL, VPR) relative to the second viewport (VPL, VPR) when the hitch angle data indicates that the towed vehicle (V2) is disposed on the first side of the towing vehicle (V1); and the second image data subset is selected to increase the prominence of the second viewport (VPL, VPR) relative to the first viewport (VPL, VPR) when the hitch angle data indicates that the towed vehicle (V2) is disposed on the second side of the towing vehicle (V1). In a variant, the control system (1) is configured to adjust the prominence of the first viewport (VPL, VPR) relative to the second viewport (VPL, VPR) in dependence on steering angle data indicative of a steering angle (β) (of the vehicle (V1). The present invention relates to a vehicle (V1, V2) incorporating the control system (1); a method of assisting an occupant of a vehicle (V1); computer software; and a non-transitory, computer-readable storage medium.

13 Claims, 10 Drawing Sheets

(51) Int. Cl.

| | | |
|---|---|---|
| *B60R 1/25* | (2022.01) | |
| *B60R 1/26* | (2022.01) | |
| *B62D 15/02* | (2006.01) | |

(52) U.S. Cl.
CPC ...... *B62D 15/024* (2013.01); *B60R 2300/105* (2013.01); *B60R 2300/302* (2013.01); *B60R 2300/303* (2013.01); *B60R 2300/806* (2013.01)

(56) References Cited

U.S. PATENT DOCUMENTS

| | | | | |
|---|---|---|---|---|
| 9,610,975 | B1 * | 4/2017 | Hu | B60D 1/06 |
| 11,772,560 | B2 * | 10/2023 | Lynema | B60R 1/23 |
| | | | | 348/148 |
| 2008/0044061 | A1 * | 2/2008 | Hongo | B60R 1/00 |
| | | | | 382/104 |
| 2014/0085472 | A1 * | 3/2014 | Lu | B60R 1/26 |
| | | | | 348/148 |
| 2016/0129939 | A1 | 5/2016 | Singh et al. | |
| 2016/0167583 | A1 * | 6/2016 | Schrepfer | B60R 11/04 |
| | | | | 348/148 |
| 2017/0174022 | A1 * | 6/2017 | Hu | G06V 40/20 |
| 2019/0241126 | A1 | 8/2019 | Murad et al. | |
| 2020/0282910 | A1 * | 9/2020 | Nagasamy | G06N 3/08 |
| 2020/0334475 | A1 * | 10/2020 | Joseph | G06V 20/584 |
| 2021/0053490 | A1 | 2/2021 | Smits | |

OTHER PUBLICATIONS

International Search Report corresponding to International Application No. PCT/EP2020/073972, dated Oct. 28, 2020, 4 pages.
Written Opinion corresponding to International Application No. PCT/EP2020/073972, dated Oct. 28, 2020, 7 pages.

* cited by examiner

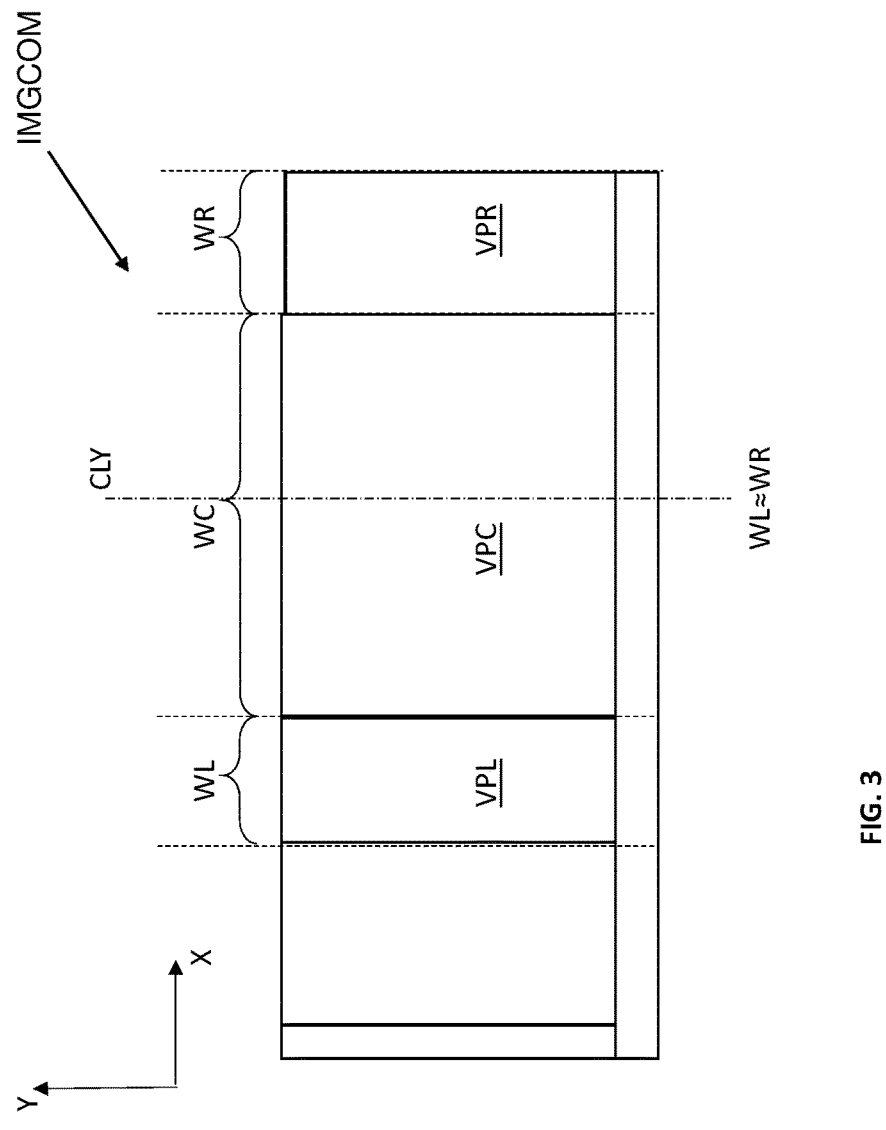
FIG. 3
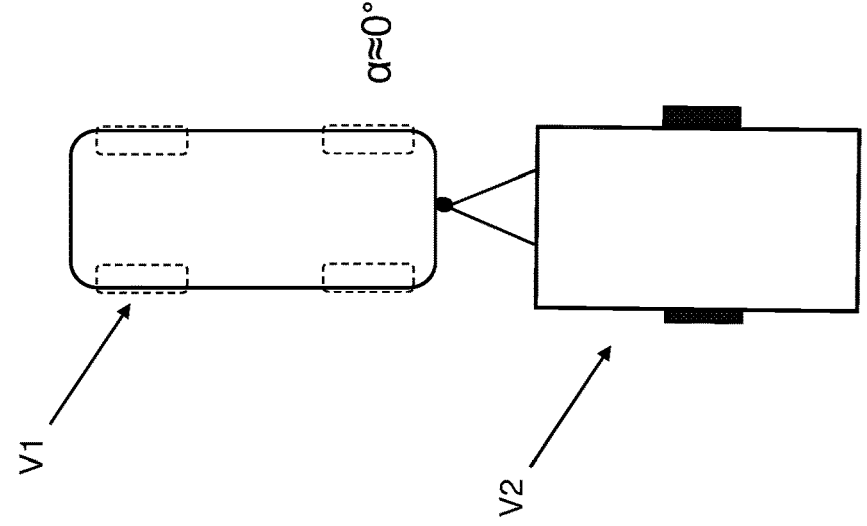

CONTROL SYSTEM AND METHOD

TECHNICAL FIELD

The present disclosure relates to a control system and method. Aspects of the invention relate to a control system for providing assistance to a vehicle occupant, a vehicle, a method of assisting a vehicle occupant, computer software and a non-transitory, and to a computer-readable storage medium.

BACKGROUND

It is known to provide a vehicle with a camera system comprising one or more cameras operative to capture images of an area around the vehicle. The camera system typically utilises cameras having a wider field of view than is output to the user. The camera system is configured to select only a fixed portion of the field of view of each camera, for example to form a composite image (such as a birds-eye view). The different perspective views provided by the camera system may be achieved through transformation of images with fixed horizontal and vertical fields of view. Applying the image transformations can lead to a degradation in the quality of the image data, potentially leading to a lowering in the perceived quality of the resulting composite images.

It is an aim of the present invention to address one or more of the disadvantages associated with the prior art.

SUMMARY OF THE INVENTION

Aspects and embodiments of the invention provide a control system for providing assistance to a vehicle occupant, a vehicle, a method of assisting a vehicle occupant, computer software and a non-transitory, computer-readable storage medium as claimed in the appended claims.

According to an aspect of the present invention there is provided a control system for providing assistance to an occupant of a towing vehicle, the control system comprising one or more controllers, the control system configured to:

receive hitch angle data indicative of a hitch angle of a towed vehicle coupled to the towing vehicle;

select first and second image data subsets of at least first image data, the first image data subset representing a first viewport on a first side of the towing vehicle and the second image data subset representing a second viewport on a second side of the towing vehicle; and output a signal indicative of the first image data subset and the second image data subset to at least one display for displaying the first viewport and the second viewport to the occupant of the towing vehicle;

wherein the control system is configured to select the first image data subset and the second image data subset in dependence on the hitch angle data; the first image data subset being selected to increase the prominence of the first viewport relative to the second viewport when the hitch angle data indicates that the towed vehicle is disposed on the first side of the towing vehicle; and the second image data subset being selected to increase the prominence of the second viewport relative to the first viewport when the hitch angle data indicates that the towed vehicle is disposed on the second side of the towing vehicle.

The or each controller may comprise at least one electronic processor for receiving the hitch angle data indicative of a hitch angle of a towed vehicle coupled to the towing vehicle. The at least one electronic processor may comprise one or more electrical inputs for receiving the hitch angle data. The at least one electronic processor may be configured to select the first and second image data subsets.

The or each controller may comprise at least one memory device electrically coupled to the at least one electronic processor and having instructions stored therein. The at least one electronic processor may be configured to access the at least one memory device and execute the instructions thereon. The at least one electronic processor may be configured to select the first image data subset and the second image data subset in dependence on the hitch angle data.

The at least one electronic processor may comprise one or more electrical outputs for outputting the signal indicative of the first image data subset and the second image data subset. The at least one electronic processor may output the signal to a suitable display device, such as a screen.

The control system may receive steering angle data indicative of a steering angle of the towing vehicle. The control system may be configured to select the first image data subset and the second image data subset in dependence on the hitch angle data and the steering angle data.

According to a further aspect of the present invention there is provided a control system for providing assistance to an occupant of a vehicle, the control system comprising one or more controllers, the control system configured to:

receive steering angle data indicative of a steering angle of the vehicle;

select first and second image data subsets of at least first image data, the first image data subset representing a first viewport on a first side of the vehicle and the second sub-image data representing a second viewport on a second side of the vehicle; and output a signal indicative of the first image data subset and the second image data subset to at least one display for displaying the first viewport and the second viewport to the occupant of the vehicle;

wherein the control system is configured to select the first image data subset and the second image data subset in dependence on the steering angle data; the first image data subset being selected to increase the prominence of the first viewport relative to the second viewport when the steering angle data indicates a travel direction towards a first viewport on the first side of the vehicle; and the second image data subset being selected to increase the prominence of the second viewport relative to the first viewport when the steering angle data indicates a travel direction towards a second viewport on the second side of the vehicle.

The or each controller may comprise at least one electronic processor for receiving the steering angle data indicative of a steering angle of the vehicle. The at least one electronic processor may comprise one or more electrical inputs for receiving the steering angle data. The at least one electronic processor may be configured to select the first and second image data subsets.

The or each controller may comprise at least one memory device electrically coupled to the at least one electronic processor and having instructions stored therein. The at least one electronic processor may be configured to access the at least one memory device and execute the instructions thereon. The at least one electronic processor may be configured to select the first image data subset and the second image data subset in dependence on the hitch angle data.

The at least one electronic processor may comprise one or more electrical outputs for outputting the signal indicative of the first image data subset and the second image data subset. The at least one electronic processor may output the signal to a suitable display device, such as a screen.

The control system may be configured to receive hitch angle data indicative of a hitch (articulation) angle of a towed vehicle, such as a trailer, coupled to the vehicle. The control system may be configured to select the first image data subset and the second image data subset in dependence on the steering angle data and the hitch angle data.

At least in certain embodiments, the control system may provide improved situational awareness for a driver of the vehicle. The display of the first and second viewports may be controlled to provide increases awareness of an area of interest. The area of interest may, for example, represent a region corresponding to a direction of travel of the vehicle or a towed vehicle, such as a trailer. By dynamically modifying the display of the first and second viewports, at least in certain embodiments the quality output by the control system may be improved.

The first and second viewports may be displayed as separate images. Alternatively, the first and second viewports may form at least part of a composite image. The composite image may, for example, comprise or consist of said first and second viewports. The composite image may optionally comprise a third viewport, for example derived from a third image captured by a third imaging device. The third imaging device may be centrally mounted on the vehicle. Alternatively, the third imaging device may be disposed on a trailer coupled to the vehicle. The third imaging device may, for example, be mounted on the trailer in a rearward-facing orientation. The third imaging device may be mounted at the rear of the trailer having a suitable position and orientation. The third image captured may comprise or consist of a region behind the trailer. The first and second viewports may be displayed on opposing sides of the third viewport in the composite image.

The prominence of the first and second viewports can be adjusted dynamically. By way of example, the composition of a composite image may be modified in dependence on the determined articulation angle and/or the steering angle. The proportion of the composite image occupied by the first and second viewports may be adjusted dynamically. Each of the first and second viewports may, for example, comprise a sub-image forming a part of the composite image. The size and/or position of the first and second viewports may be modified in dependence on the determined articulation angle and/or the determined steering angle. For example, a travel direction (or trajectory) of the towed vehicle may be determined in dependence on both the articulation angle and the steering angle. The relative prominence of the first and second viewports may be adjusted in dependence on the determined travel direction of the towed vehicle.

The control system may be configured to receive first image data from a first imaging device, the first image data representing a first image on the first side of the towing vehicle. The first image data subset is selected from the first image data. The first viewport may comprise or consist of a portion of the first image.

The control system may be configured to receive second image data from a second imaging device, the second image data representing a second image on the second side of the towing vehicle. The second image data subset may be selected from the second image data. The second viewport may comprise or consist of a portion of the second image.

The first image data may be received from a first imaging device. The first image data may represent a first image. The first and second image data subsets may be selected from the first image data. The first and second image data subsets may partially overlap with each other. However, the likelihood of an overlap between the first and second image data subsets is believed to be small. The first and second image data subsets may be independent of each other. The first image data subset may be distinct from the second image data subset. The first imaging device may be a wide-angle imaging device, for example an optical camera having a wide-angle lens. The first and second image data subsets may both be selected from the first image data. The first and second image data subsets may comprise discrete portions of the first image data.

Increasing the prominence of the first viewport may comprise increasing the size of the first viewport relative to the second viewport. Increasing the size of the first viewport may comprise increasing a width of the first viewport. Alternatively, or in addition, the prominence of the first viewport may be increased by modifying the relative positioning or orientation of the first and second viewports.

Increasing the prominence of the second viewport may comprise increasing the size of the second viewport relative to the first viewport. Increasing the size of the second viewport may comprise increasing a width of the second viewport. Alternatively, or in addition, the prominence of the second viewport may be increased by modifying the relative positioning or orientation of the first and second viewports.

According to a further aspect of the present invention there is provided a vehicle comprising a control system as described herein. The vehicle may be a towing vehicle which is coupled to a towed vehicle, such as a trailer. The control system may be configured to provide assistance only when the vehicle is reversing.

According to a still further aspect of the present invention there is provided a method of providing assistance to an occupant of a towing vehicle, the method comprising:
    determining a hitch angle of a towed vehicle coupled to the towing vehicle;
    selecting a first viewport on a first side of the towing vehicle and a second viewport on a second side of the towing vehicle; and
    displaying the first viewport and the second viewport to the occupant of the towing vehicle;
    wherein the first and second viewports are selected in dependence on the determined hitch angle; the prominence of the first viewport being increased relative to the second viewport when the determined hitch angle indicates that the towed vehicle is disposed on the first side of the towing vehicle; and the prominence of the second viewport is increased relative to the first viewport when the determined hitch angle indicates that the towed vehicle is disposed on the second side of the towing vehicle.

According to a still further aspect of the present invention there is provided a method of providing assistance to an occupant of a vehicle, the method comprising:
    determining a steering angle of the vehicle;
    selecting a first viewport on a first side of the towing vehicle and a second viewport on a second side of the towing vehicle; and
    displaying the first viewport and the second viewport to the occupant of the towing vehicle;
    wherein the first and second viewports are selected in dependence on the determined steering angle; the prominence of the first viewport being increased relative to the second viewport when the determined steering angle indicates a travel direction towards a first viewport on the first side of the vehicle; and the prominence of the second viewport being increased relative to the first viewport when the determined steering angle indicates a travel direction towards a second viewport on the second side of the vehicle.

The first viewport may comprise or consist of a portion of a first image. The first image may be captured by a first imaging device disposed on a first side of the towing vehicle.

The second viewport may comprise or consist of a portion of a second image. The second image may be captured by a second imaging device disposed on a second side of the towing vehicle.

The first and second viewports may both be selected from a first image.

Increasing the prominence of the first viewport may comprise increasing the size of the first viewport relative to the second viewport. Increasing the size of the first viewport may comprise increasing a width of the first viewport. Alternatively, or in addition, the prominence of the first viewport may be increased by modifying the relative positioning or orientation of the first and second viewports.

Increasing the prominence of the second viewport may comprise increasing the size of the second viewport relative to the first viewport. Increasing the size of the second viewport may comprise increasing a width of the second viewport. Alternatively, or in addition, the prominence of the second viewport may be increased by modifying the relative positioning or orientation of the first and second viewports.

According to a further aspect of the present invention there is provided computer software that, when executed, is arranged to perform a method as described herein.

According to still a further aspect of the present invention there is provided a non-transitory, computer-readable storage medium storing instructions thereon that, when executed by one or more electronic processors, causes the one or more electronic processors to carry out the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3 represents a composite image generated when the towing vehicle and the towed vehicle are aligned with each other;

DETAILED DESCRIPTION

A control system 1 in accordance with an embodiment of the present invention will now be described with reference to the accompanying figures. The control system 1 is suitable for providing assistance to a driver DRV of a vehicle V1.

Figure 1:
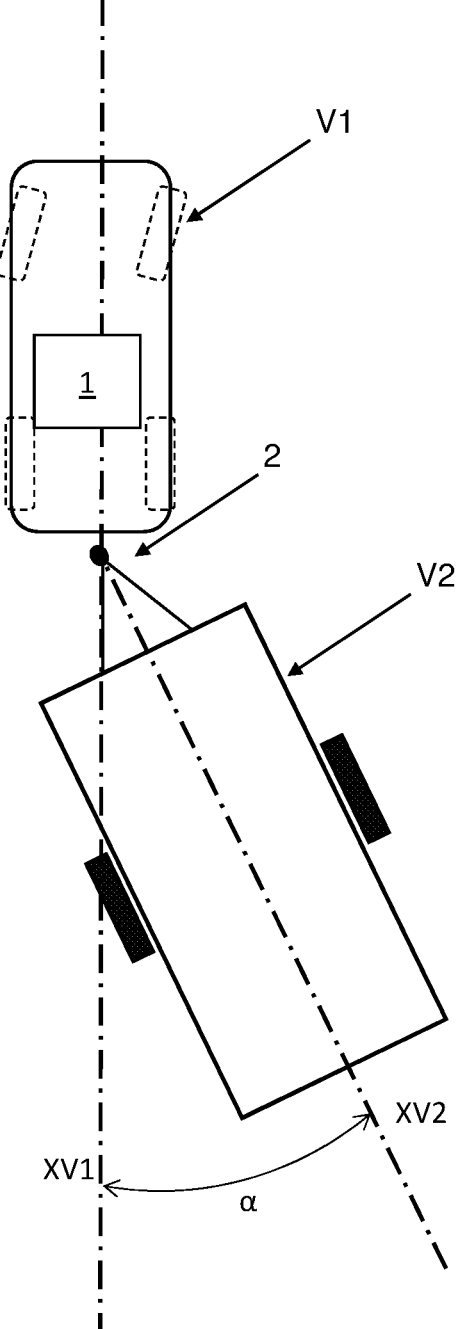
FIG. 1 shows a schematic representation of the control system according to an embodiment of the present invention implemented in a towing vehicle coupled to a towed vehicle.

As shown in FIG. 1, the vehicle V1 is a towing vehicle and is coupled to a towed vehicle V2 by an articulated coupling 2. A schematic representation of the towing vehicle V1 and the towed vehicle V2 is shown in FIG. 1. The towing vehicle V1 in the present embodiment is an automobile. Other types of towing vehicle V1 are contemplated, such as a utility vehicle, a sports utility vehicle, a tractor, a truck etc. The towed vehicle V2 in the present embodiment is a trailer. The towing vehicle V1 has a first longitudinal axis XV1; and the towed vehicle V2 has a second longitudinal axis XV2. A schematic representation of the towing vehicle V1 is shown in FIG. 2.

Figure 2:
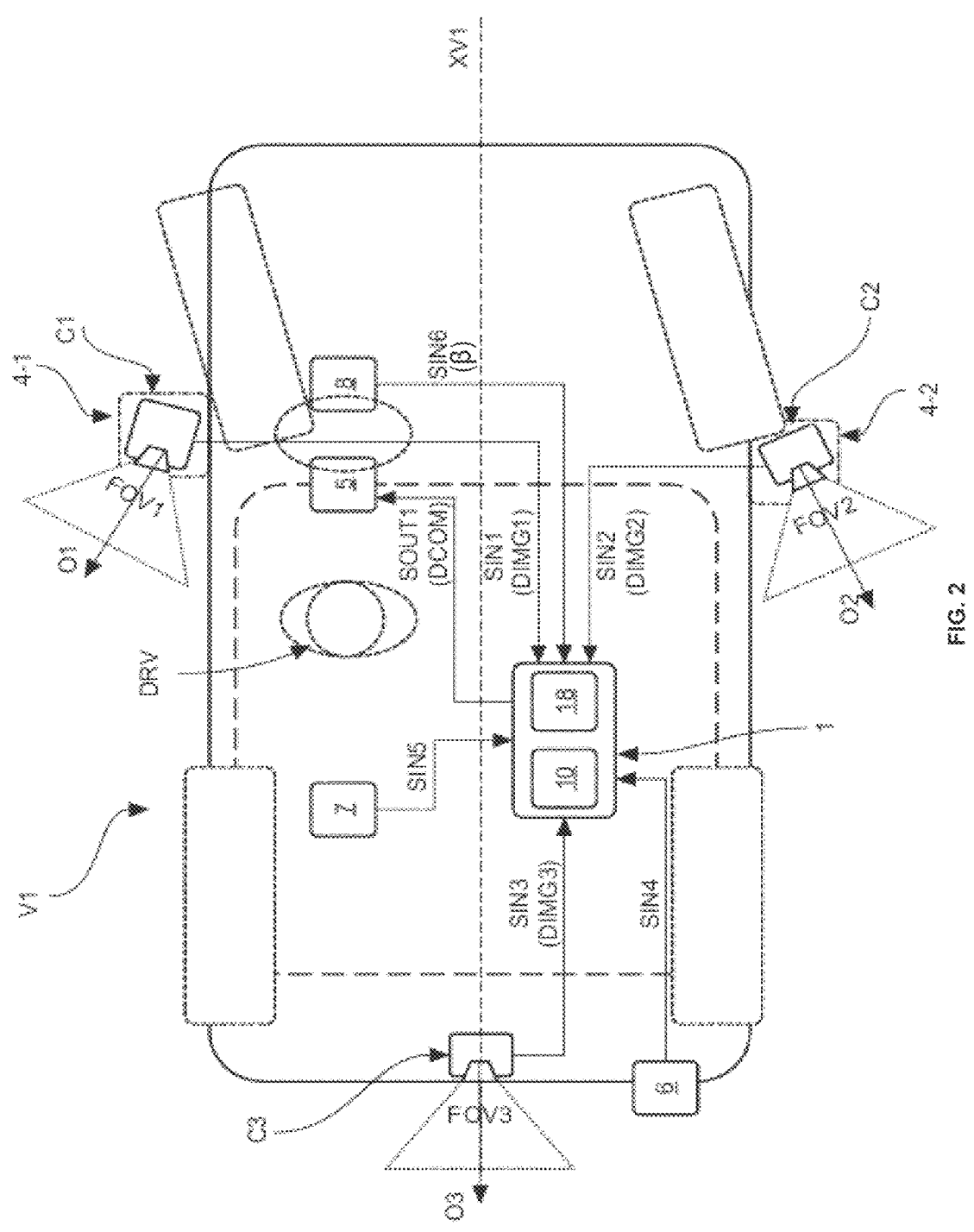
FIG. 2 shows a schematic representation of the towing vehicle shown in FIG. 1.

As shown in FIG. 2, first and second imaging devices C1, C2 are disposed on the towing vehicle V1. The first and second imaging devices C1, C2 are located on opposing sides of the towing vehicle V1. The first imaging device C1 is disposed on the left hand side of the towing vehicle V1; and the second imaging device C2 is disposed on the right hand side of the towing vehicle V1. The first and second imaging devices C1, C2 in the present embodiment are mounted in respective first and second side housings 4-1, 4-2. Other mounting locations are contemplated for the first and second imaging devices C1, C2. The first and second imaging devices C1, C2 are optical cameras in the present embodiment. The first and second imaging devices C1, C2 are oriented in a rear-facing direction to capture first and second lateral images IMG1, IMG2 on opposing sides of the towing vehicle V1 and the towed vehicle V2. As shown in FIG. 1, the first and second imaging devices C1, C2 have respective first and second fields of view FOV1, FOV2. The first and second imaging devices C1, C2 have respective first and second optical axes O1, O2 which are inclined at an acute angle relative to the first longitudinal axis XV1. The first and second fields of view FOV1, FOV2 are oriented such that they provide increased coverage to the sides of the towing vehicle V1. In use, the first imaging device C1 generates first image data DIMG1 which represent the first lateral image IMG1. The first imaging device C1 outputs a first signal SIN1 comprising said first image data DIMG1 which represents the first lateral image IMG1. In use, the second imaging device C2 generates second image data DIMG2 which represent the second lateral image IMG2. The second imaging device C2 outputs a second signal SIN2 comprising said second image data DIMG2 which represents the second lateral image IMG2.

A third imaging device C3 is disposed at the back of the towing vehicle V2 and oriented in a rear-facing direction. The third imaging device C is mounted centrally at the rear of the towing vehicle V1, for example above a rear license plate (not shown). Other mounting locations for the third imaging device C3 are contemplated. The third imaging device C3 comprises a central camera C3. The third imaging device C3 has an optical axis substantially parallel to the first longitudinal axis XV1. The third imaging device C3 has a third field of view FOV3 which encompasses a central region to the rear of the towing vehicle V1. The third imaging device C3 has a third optical axis O3 which is aligned with the first longitudinal axis XV1. In use, the third imaging device C3 generates third image data DIMG3 corresponding to a central image IMG3. The central vehicle image IMG3 comprises a rear-facing scene from the towing vehicle V1 captured by the third imaging device C3. The third imaging device C3 outputs a third signal SIN3 comprising said third image data DIMG3 corresponding to the third vehicle image IMG3.

The first, second and third imaging devices C1, C2, C3 are digital video cameras operable to capture a plurality of image frames per second. The first, second and third imaging device C3 may have a wide-angle lens, for example having an angle of view of approximately 180°. It will be understood that the first, second and third imaging devices C1, C2, C3 may have narrower angles of view. The first, second and third imaging devices C1, C2, C3 may be a mono camera or a stereo camera. The third imaging device C3 can function as a reversing camera to provide a parking aid for the towing vehicle V1.

The control system 1 comprises one or more controller 10. The controller 10 is in communication with each of the first, second and third imaging devices C1, C2, C3. In particular, the control system 1 is configured to receive the first, second and third image data DIMG1, DIMG2, DIMG3. The controller 10 is configured to generate a composite image IMGCOM composed of at least a portion of each of the first image data DIMG1, the second image data DIMG2 and the third image data DIMG3. The composite image IMGCOM is generated at least substantially in real time. The controller 10 generates composite image data DOOM which represents the composite image IMGCOM. The composite image data DOOM is output to a display screen 5, for example provided in an instrument cluster (not shown) or a centre console (not shown) in a cabin of the towing vehicle V1. The display screen 5 may, for example, form part of a vehicle infotainment system. The controller 10 generates an output signal SOUT1 comprising the composite image data DOOM.

Schematic representations of the composite image IMGCOM is shown in FIGS. 3 to 7. The composite image IMGCOM is described herein with reference to a horizontal axis X and a vertical axis Y. The composite image IMGCOM has a vertical centreline CLY. The composite image IMGCOM is composed of a central viewport VPC, a left viewport VPL and a right viewport VPR. The central viewport VPC comprises or consists of part or all of the third image IMG3 received from the third imaging device C3. The left viewport VPL comprises or consists of at least a portion of the first image IMG1 captured by the first imaging device C1. The left viewport VPL is generated by selecting a first image data sub-set of the first image data DIMG1. The right viewport VPR comprises or consists of at least a portion of the second image IMG2 captured by the second imaging device C2. The right viewport VPR is generated by selecting a second image data sub-set of the second image data DIMG2. The composite image IMGCOM forms a substantially continuous representation of the region to the rear and sides of the towing vehicle V1. The first, second and third images IMG1, IMG2, IMG3 may be selected to provide a substantially uninterrupted composite field of view. Alternatively, or in addition, image processing techniques (such as blending, scaling, perspective shifts, etc.) may be applied to one or more of the first, second and third images IMG1, IMG2, IMG3, for example to account for the different locations of the first, second and third imaging devices C1, C2, C2 on the towing vehicle V1.

In the present embodiment, the dimensions of the central viewport VPC within the composite image IMGCOM are substantially fixed. In particular, a width WC of the central viewport VPC is fixed. By maintaining the dimensions of the central viewport VPC at least substantially constant, the user is provided with a consistent view of the central region behind the towing vehicle V1. One or more graphical elements or indicators may be displayed to identify the lateral limits of the central viewport VPC within the composite image IMGCOM. Alternatively, or in addition, one or more graphical elements or indicators may be displayed to identify the lateral extent of the towing vehicle 2 within the composite image IMGCOM. In alternate embodiments, the dimensions of the central viewport VPC could be variable. The control system 1 is configured to adjust the relative prominence of the left and right viewports VPL, VPR. In the present embodiment, the relative prominence of the left and right viewports VPL, VPR is controlled by dynamically modifying the dimensions of each of the left and right viewports VPL, VPR. In the present embodiment, at least the width (i.e. the dimension in the horizontal X axis) of each of the left and right viewports VPL, VPR is adjusted. The control system 1 is configured to select a first image data subset from the first image data DIMG1 to generate the left viewport VPL; and to select a second image data subset from the second image data DIMG1 to generate the right viewport VPR. The first and second image data subsets may be proper or improper sets of the first and second image data DIMG1, DIMG2. In certain embodiments, the first and second data subsets may each consist of only a portion of the respective first and second image data DIMG1, DIMG2. Alternatively, or in addition, the height (i.e. the dimension in the vertical Y axis) of each of the left and right viewports VPL, VPR can be adjusted. In a variant, the relative prominence of the left and right viewports VPL, VPR may be controlled by changing the display location off the left and right viewports VPL, VPR.

In order to maintain a substantially constant width of the composite image IMGCOM, the widths of the left and right viewports VPL, VPR are adjusted in a complementary manner. An increase in the width WL of the left viewport VPL is accompanied by a corresponding reduction in the width WR of the right viewport VPR. Conversely, an increase in the width WR of the right viewport VPR is accompanied by a corresponding reduction in the width WL of the left viewport VPL. The lateral position of the central viewport VPC within the composite image IMGCOM is adjusted in dependence on the changes in the width of the left and right viewports VPL, VPR. The central viewport VPC shifts to the left of the vertical centreline CLY of the composite image IMGCOM when there is a reduction in the width WL of the left viewport VPL (and a corresponding increase in the width WR of the right viewport VPR). Conversely, the central viewport VPC shifts to the right of the vertical centreline CLY of the composite image IMG-COM when there is a reduction in the width WR of the right viewport VPR (and a corresponding increase in the width WL of the left viewport VPL). In a variant, the width of the composite image IMGCOM may be variable. For example, the position and dimensions of the centre viewport VPC may be fixed and the width of each of the left and right viewports VPL, VPR varied. The change in width of the composite image IMGCOM may, for example, be accommodated within the display 5 by relocating information or graphics.

As outlined above, the towing vehicle V1 is coupled to the towed vehicle V2 by an articulated coupling 2. A hitch (articulation) angle α defines the angular orientation of the first longitudinal axis XV1 and the second longitudinal axis XV2. The hitch angle α is zero degrees)(α=0° when the towing vehicle V1 and the towed vehicle V2 are substantially aligned with each other. The hitch angle α is described herein as a positive variable (+ve) when the towed vehicle V2 is displaced in a clockwise direction relative to the towing vehicle V1 (when viewed from above); and a negative variable (−ve) when the towed vehicle V2 is displaced in an anticlockwise direction relative to the towing vehicle V1 (when viewed from above). It will be understood that the reference frame for the hitch angle α may be reversed. When the hitch angle α is zero degrees (α=0°), the towing vehicle V1 and the towed vehicle V2 are substantially aligned with each other. The first and second longitudinal axes XV1, XV2 are aligned with each other when the hitch angle α is zero degrees (α=0°). When the hitch angle α is greater than zero degrees (α>0°), the towed vehicle V2 is oriented so as to project outwardly on the right hand side of the towing vehicle V1 (when viewed from the rear). When the hitch angle α is less than zero degrees (α<0°), the towed vehicle V2 is oriented so as to project outwardly on the left hand side of the towing vehicle V1 (when viewed from the rear).

The hitch angle α may be measured, for example by a hitch angle sensor 6 provided on the articulated coupling 2. The control system 1 receives a hitch angle signal SIN4 comprising hitch angle data captured by the hitch angle sensor 6. Alternatively, or in addition, the control system 1 may determine the hitch angle α by analysing the third image IMG3 captured by the third imaging device C3 which encompasses at least a portion of the front of the towed vehicle V2 (for example a front face of the towed vehicle and/or a coupling member connected to the towing vehicle V1). A target may optionally be mounted on the towed vehicle V2 to facilitate determination of the hitch angle α.

The controller 10 is configured dynamically to adjust the relative size of the left and right viewports VPL, VPR in dependence on the determined hitch angle α. In particular, the controller 10 is configured to select the first image data subset to adjust a width WL of the left viewport VPL; and to select the second image data subset to adjust a width WR of the right viewport VPR. The controller 10 receives the hitch angle signal from the hitch angle sensor 6 and determines the orientation of the towed vehicle V2 relative to the towing vehicle V1. If the towed vehicle V2 is oriented so as to project outwardly on the left hand side of the towing vehicle V1 (i.e. the hitch angle α is less than zero degrees (α<0°)), the first image data subset is selected such that the width of the left viewport VPL is increased and the second image data subset is selected such that the width of the right viewport VPR is decreased. If the towed vehicle V2 is oriented so as to project outwardly on the right hand side of the towing vehicle V1 (i.e. the hitch angle α is greater than zero degrees (α>0°)), the first image data subset is selected such that the width of the left viewport VPL is decreased and the second image data subset is selected such that the width of the right viewport VPR is increased. The width of the left and right viewports VPL, VPR is proportional to the determined hitch angle α. By modifying the width WL, WR of the left and right viewports VPL, VPR, the view output to the display 5 can be controlled dynamically. At least in certain embodiments, the driver DRV may be provided with a dynamic representation of the view to the sides of the towing vehicle V1.

In the present embodiment, the controller 10 is configured to modify the sizes of the left and right viewports VPL, VPR only when the towing vehicle V1 is reversing (i.e. travelling backwards). The travel direction of the towing vehicle V1 may be determined in dependence on a selected transmission ratio. The controller 10 in the present embodiment receives a transmission signal SIN5 from a transmission control unit 7 to determine a current transmission ratio. The controller 10 determines that the towing vehicle V1 is reversing when a reverse gear is selected. The controller 10 may be configured to set the width of the left and right viewports VPL, VPR when the selected transmission ratio provides travel in a forward direction. The controller 10 may be configured to modify the width of the left and right viewport VPL, RR when the selected transmission ratio provides travel in a reverse direction. Alternatively, or in addition, the controller 10 may be configured to modify the dimensions of the left and right viewports VPL, VPR in a user-selected mode, for example in dependence on a user input. In a variant, the controller 10 may be configured to modify the sizes of the left and right viewports VPL, VPR when the towing vehicle V1 is travelling forwards. The travel direction of the towing vehicle V1 may be determined in dependence on the transmission signal SIN5 form the transmission control unit 7, for example by determining when the selected transmission ratio provides forward travel. The relative size of the left and right viewports VPL, VPR may be determined in dependence on the hitch angle α and/or a steering angle β. The composite image IMGCOM may be selectively output for display, for example in dependence on a user input. Alternatively, or in addition, the resulting image(s) may be continuously output for display, for example to provide a digital mirror function. One or more dedicated display screen may be provided for displaying the composite image IMGCOM. The display screen may, for example, be incorporated into a rear view mirror.

The operation of the control system 1 to adjust the composition of the composite image IMGCOM will now be described with reference to FIGS. 3 to 7. It will be understood that changes in the relative prominence of the left and right viewports VPL, VPR within the composite image IMGCOM are implemented progressively, for example comprising continuous or incremental changes in the width WL, WR of the left and right viewports VPL, VPR.

In the configuration shown in FIG. 3, the towing vehicle V1 and the towed vehicle V2 are aligned such that the hitch angle α (measured between the first and second longitudinal axes VX1, VX2) is substantially zero degrees (α=0°). The control system 1 is configured to select the first and second image data subsets such that, within the composite image IMGCOM, the left and right viewports VPL, VPR have substantially the same width.

Figure 4:
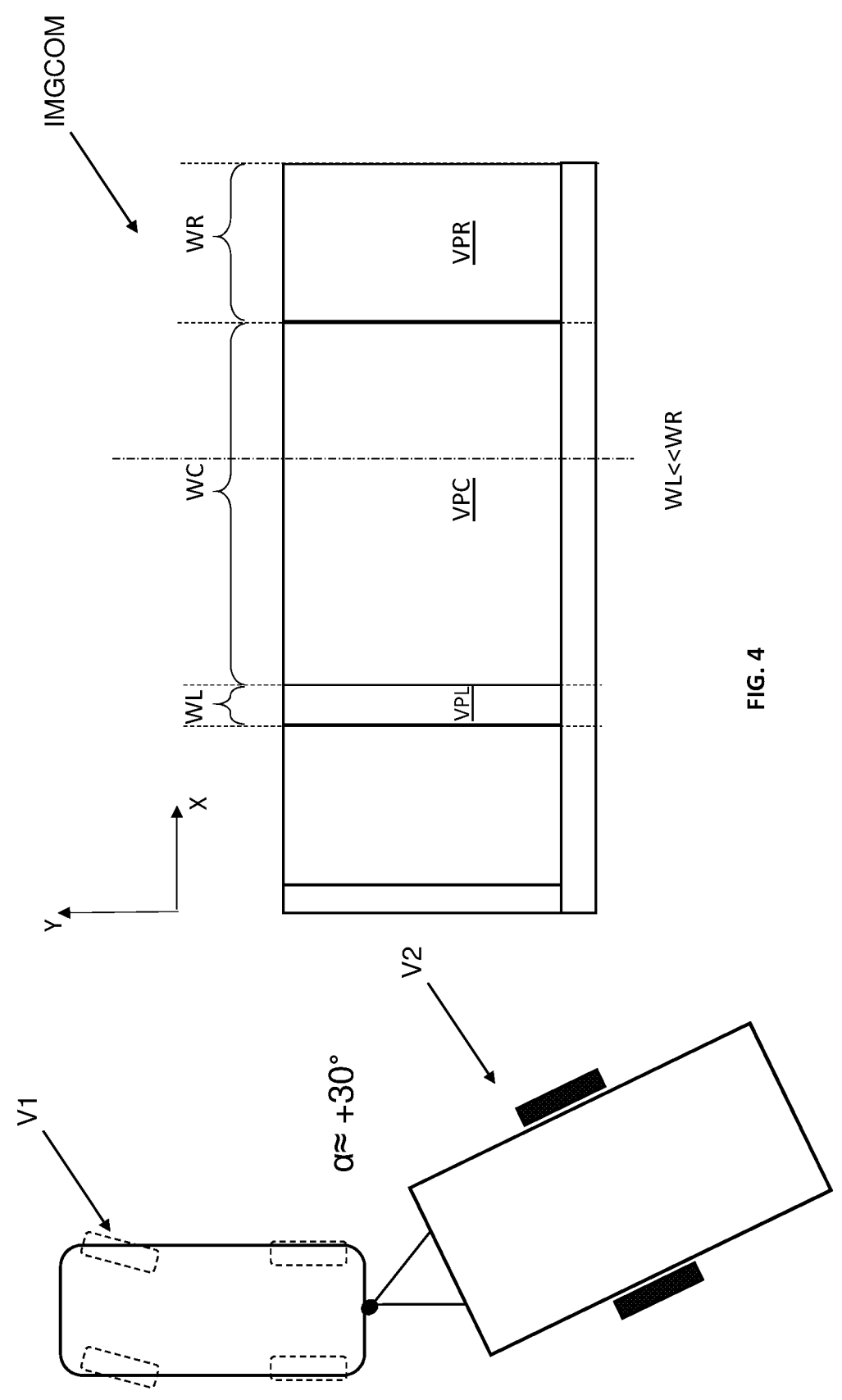
FIG. 4 represents a composite image generated when the towing vehicle and the towed vehicle are in a first articulated position.

In the configuration shown in FIG. 4, the towing vehicle V1 and the towed vehicle V2 are articulated at a first hitch angle α1 (measured between the first and second longitudinal axes VX1, VX2) which is a positive variable (+ve). By way of example, the first hitch angle α1 may be a positive variable having a value of approximately thirty degrees (α1≈+30°). The towed vehicle V2 projects outwardly on the right hand side of the towed vehicle V1. The control system 1 is configured to select the first and second image data subsets such that, within the composite image IMGCOM, the width of the left viewport VPL is decreased and the width of the right viewport VPR is increased.

Figure 5:
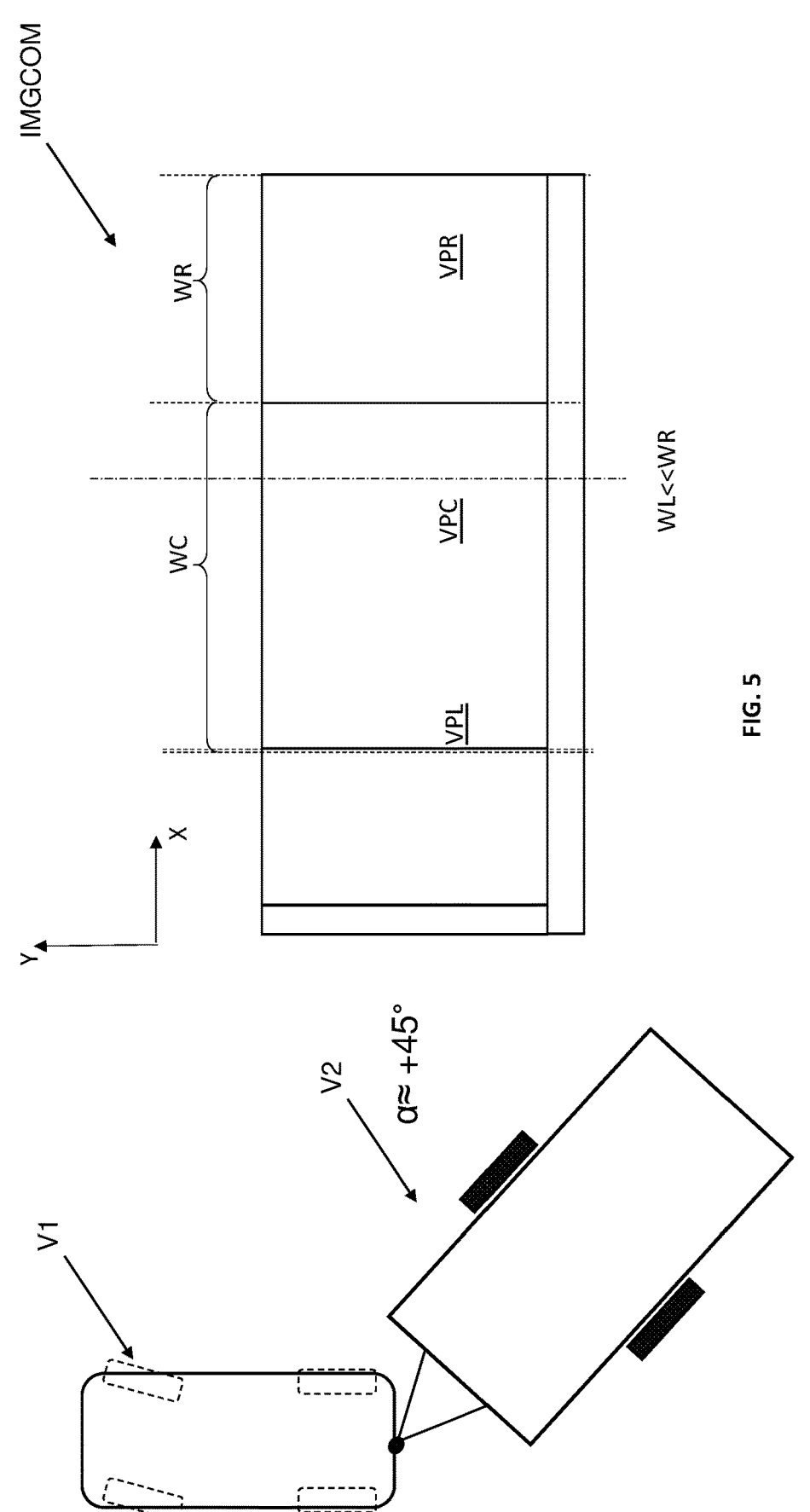
FIG. 5 represents a composite image generated when the towing vehicle and the towed vehicle are in a second articulated position.

In the configuration shown in FIG. 5, the towing vehicle V1 and the towed vehicle V2 are articulated at a second hitch angle α2 (measured between the first and second longitudinal axes VX1, VX2) which is a positive variable (+ve). By way of example, the second hitch angle α2 may be a positive variable having a value of approximately forty-five degrees (α2≈+45°). The towed vehicle V2 projects outwardly on the right hand side of the towed vehicle V1. The control system 1 is configured to select the first and second image data subsets such that, within the composite image IMGCOM, the width of the left viewport VPL is decreased further and the width of the right viewport VPR is increased. In the illustrated arrangement, the width of the left viewport VPL is decreased to zero (0). The second hitch angle α2 may correspond to a maximum hitch a (for example corresponding to a jack-knife angle).

Figure 6:
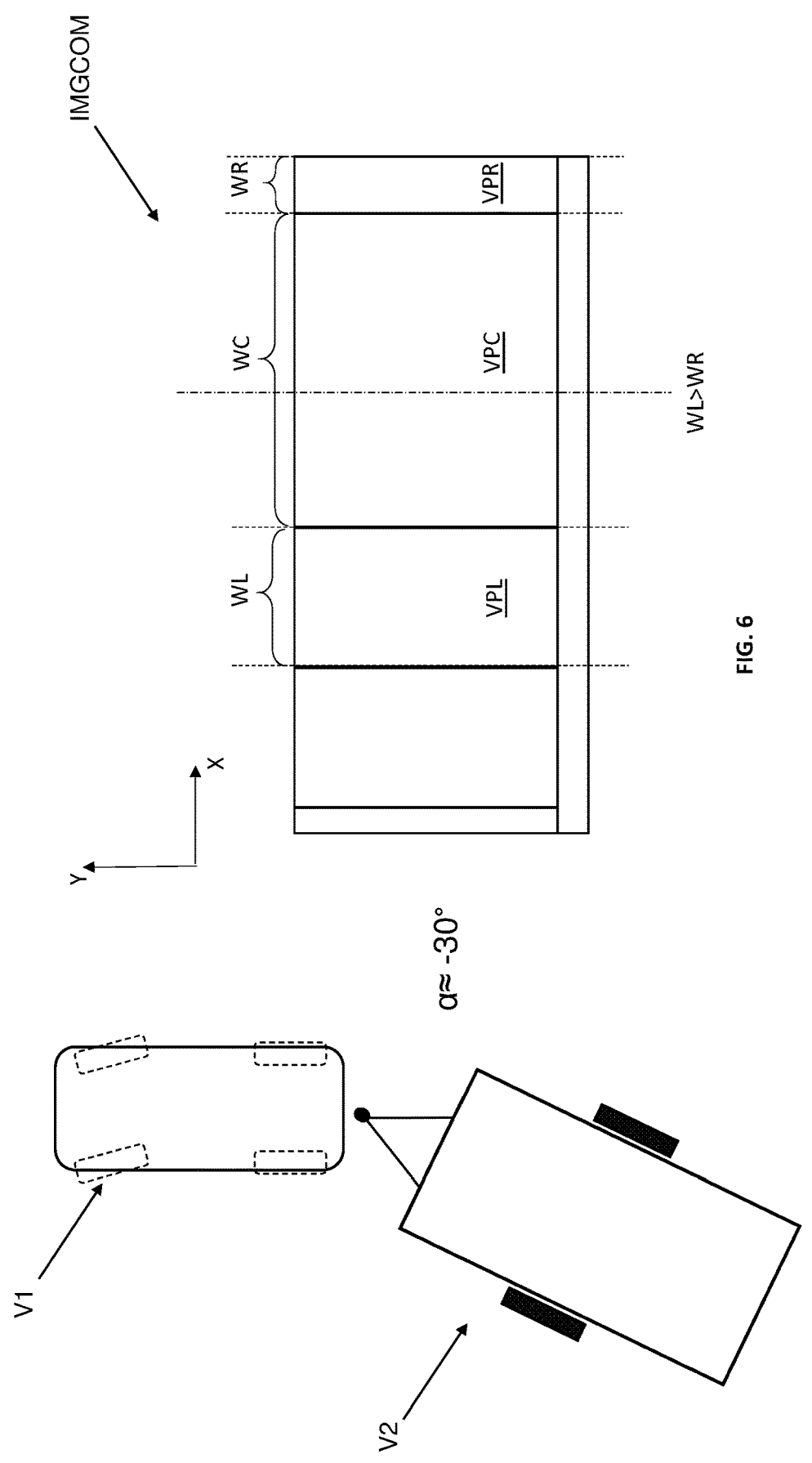
FIG. 6 represents a composite image generated when the towing vehicle and the towed vehicle are in a third articulated position.

In the configuration shown in FIG. 6, the towing vehicle V1 and the towed vehicle V2 are articulated at a third hitch angle α3 (measured between the first and second longitudinal axes VX1, VX2) which is a negative variable (−ve). By way of example, the third hitch angle α3 may be a negative variable having a value of approximately thirty degrees (α1≈−30°. The towed vehicle V2 projects outwardly on the left hand side of the towed vehicle V1. The control system 1 is configured to select the first and second image data subsets such that, within the composite image IMGCOM, the width WL of the left viewport VPL is increased and the width WR of the right viewport VPR is decreased.

Figure 7:
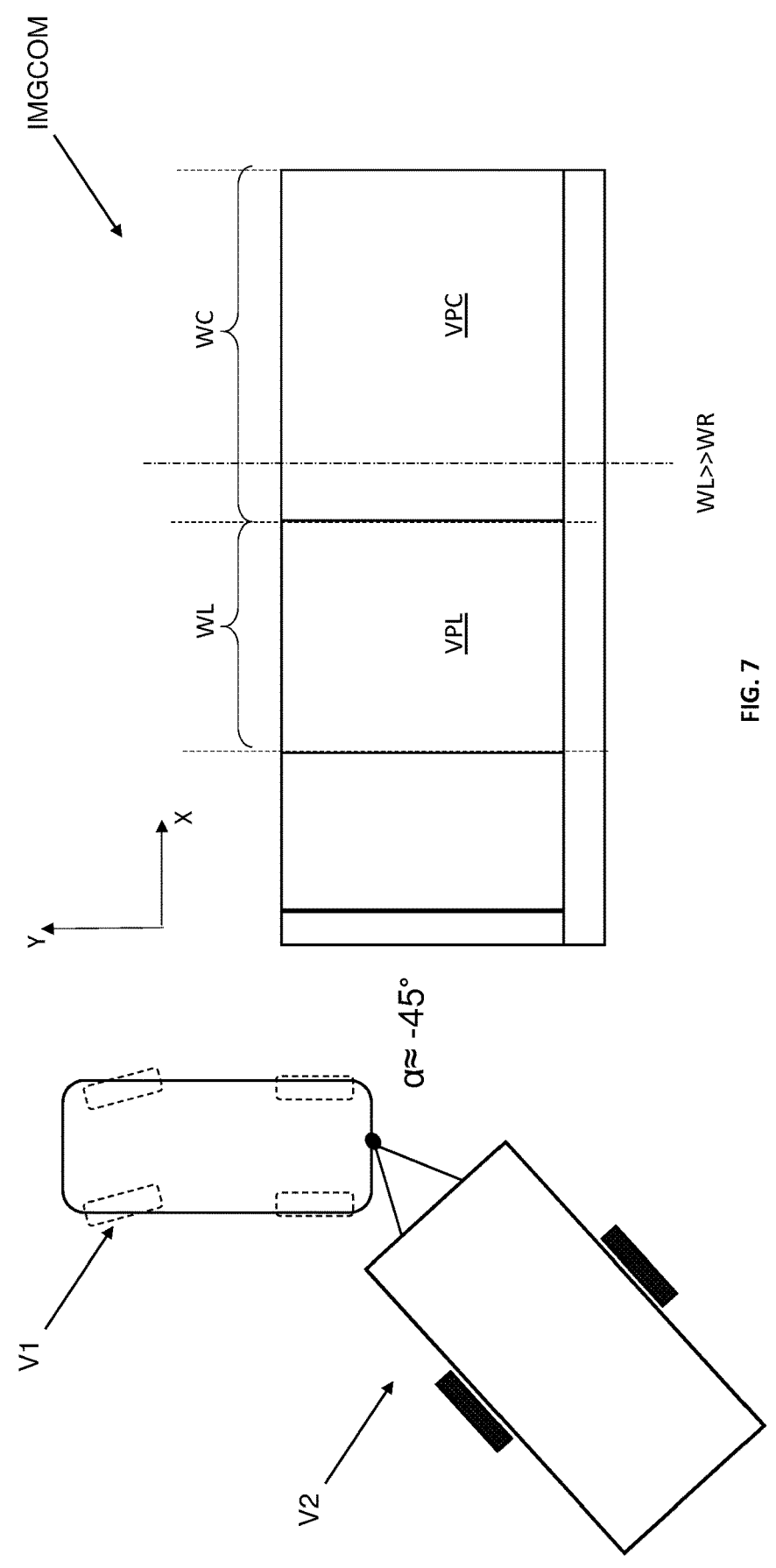
FIG. 7 represents a composite image generated when the towing vehicle and the towed vehicle are in a fourth articulated position.

In the configuration shown in FIG. 7, the towing vehicle V1 and the towed vehicle V2 are articulated at a fourth hitch angle α4 (measured between the first and second longitudinal axes VX1, VX2) which is a negative variable (−ve). By way of example, the fourth hitch angle α4 may be a negative variable having a value of approximately forty-five degrees (α4≈−45°. The towed vehicle V2 projects outwardly on the left hand side of the towed vehicle V1. The control system 1 is configured to select the first and second image data subsets such that, within the composite image IMGCOM, the width WL of the left viewport VPL is increased to a maximum value and the width WR of the right viewport VPR is decreased to a minimum value. In the illustrated arrangement, the width WR of the right viewport VPR is decreased to zero (0). The fourth hitch angle α4 may correspond to a predefined hitch angle threshold. The hitch angle threshold may represent a maximum hitch angle α (for example corresponding to a jack-knife angle).

Figure 8:
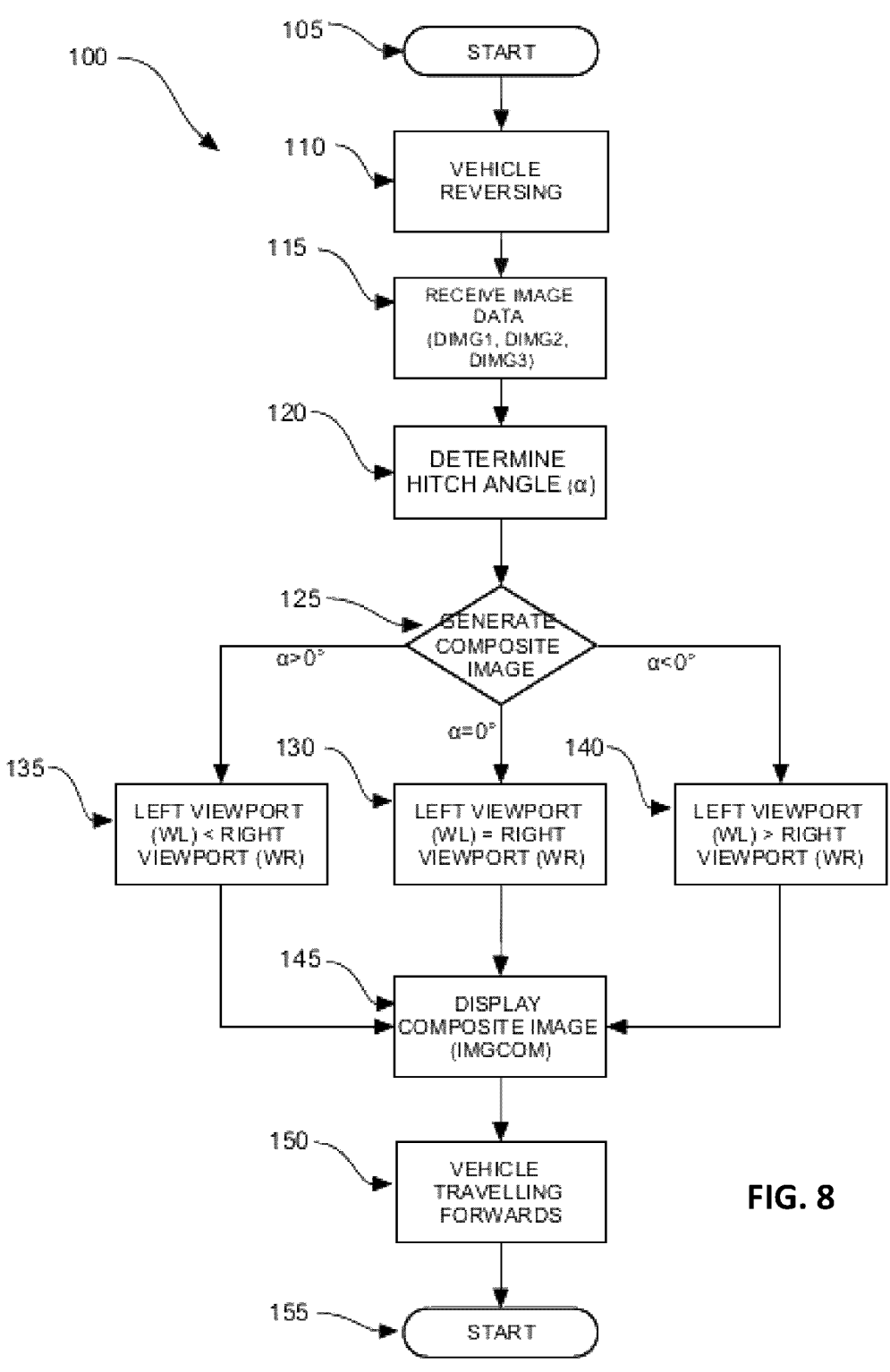
FIG. 8 shows a block diagram representing operation of the control system according to an embodiment of the present invention.

The operation of the control system 1 will now be described with reference to the block diagram 100 shown in FIG. 8. The control system 1 is activated (BLOCK 105). The control system 1 receives the transmission signal SIN5 from the transmission control unit 7 and determines that the towing vehicle V1 is in reverse (BLOCK 110). The control system 1 receives the first, second and third image data DIMG1, DIMG2, DIMG3 from the respective first, second and third imaging devices C1, C2, C3 (BLOCK 115). The control system 1 receives the hitch angle signal SIN4 from the hitch angle sensor 6 and determines the hitch angle α

(BLOCK 120). The control system 1 selects the first and second image data subsets in dependence on the determined hitch angle α. The control system 1 generates the composite image IMGCOM in dependence on the determined hitch angle α (BLOCK 125). The composite image IMGCOM comprises the centre viewport VPC, the left viewport VPL and the right viewport VPR. If the hitch angle α is zero degrees (0°), the composite image IMGCOM is generated such that the left viewport VPL and the right viewport VPR have substantially the same width (BLOCK 130). If the hitch angle α is greater than zero degrees (α>0°), the composite image IMGCOM is generated such that the width WL of the left viewport VPL is less than the width WR of the right viewport VPR (BLOCK 135). If the hitch angle α is less than zero degrees (α<0°), the composite image IMGCOM is generated such that the width (WL) of the left viewport VPL is greater than the width (WR) of the right viewport VPR (BLOCK 140). The control system 1 is configured to generate the composite image IMGCOM at least substantially in real time. The composite image IMGCOM is modified dynamically in dependence on changes in the hitch angle α. The composite image IMGCOM is output to the display 7 (BLOCK 145). The control system 1 continues to generate the composite image IMGCOM while the towing vehicle V1 is in reverse. The control system 1 receives a transmission signal SIN5 from the transmission control unit 7 indicating that a forward gear is selected and that the towing vehicle V1 is travelling forwards (BLOCK 150). The process then ends (BLOCK 155).

In the present embodiment, the controller 10 is disposed in the towing vehicle V1. It is to be understood that the or each controller 10 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 10 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 10 to implement the control techniques described herein (including some or all of the functionality required for the method described herein). The set of instructions could be embedded in said one or more electronic processors of the controller 10; or alternatively, the set of instructions could be provided as software to be executed in the controller 10. A first controller or control unit may be implemented in software run on one or more processors. One or more other controllers or control units may be implemented in software run on one or more processors, optionally the same one or more processors as the first controller or control unit. Other arrangements are also useful.

Figure 9:
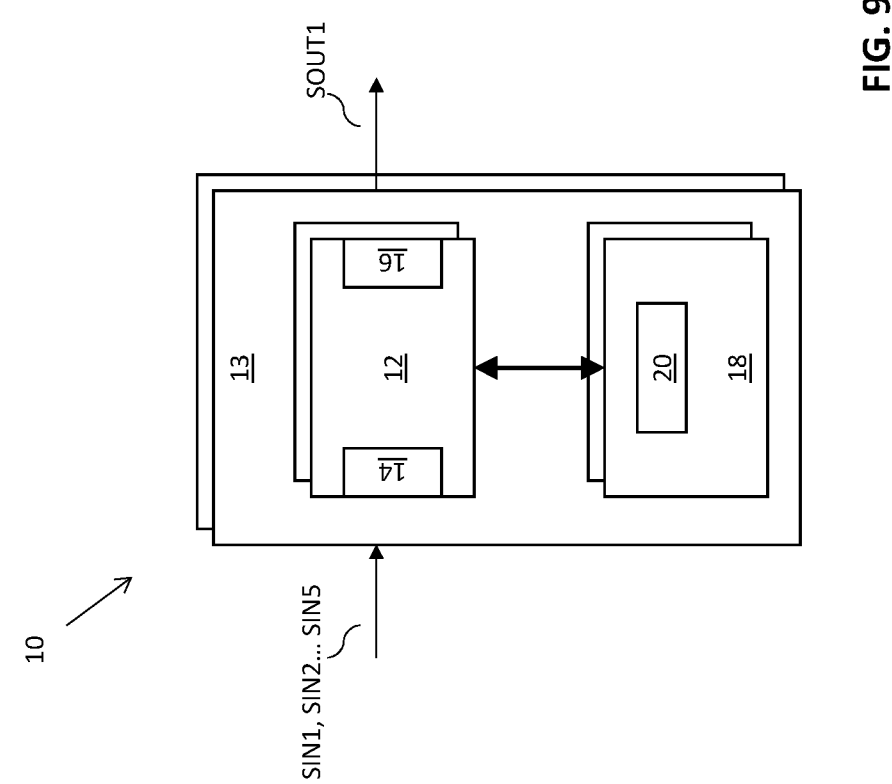
FIG. 9 shows a schematic representation of a controller of the control system in accordance with an embodiment of the invention.

As illustrated in FIG. 9, the or each controller 10 comprises at least one electronic processor 12 having one or more electrical input(s) 14 for receiving the one or more input signals SIN1, SIN2, SIN3 from the first, second and third imaging devices C1, C2, C3; and one or more electrical output(s) 16 for outputting the output signal SOUT1. The or each controller 10 further comprises at least one memory device 18 electrically coupled to the at least one electronic processor 12 and having instructions 20 stored therein. The at least one electronic processor 12 is configured to access the at least one memory device 18 and execute the instructions 20 thereon so as to perform the method(s) described herein.

The, or each, electronic processor 12 may comprise any suitable electronic processor (e.g., a microprocessor, a microcontroller, an ASIC, etc.) that is configured to execute electronic instructions. The, or each, electronic memory device 18 may comprise any suitable memory device and may store a variety of data, information, threshold value(s), lookup tables or other data structures, and/or instructions therein or thereon. In an embodiment, the memory device 18 has information and instructions for software, firmware, programs, algorithms, scripts, applications, etc. stored therein or thereon that may govern all or part of the methodology described herein. The processor, or each, electronic processor 12 may access the memory device 18 and execute and/or use that or those instructions and information to carry out or perform some or all of the functionality and methodology describe herein.

The at least one memory device 18 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

The first signal SIN1 comprising the first image data DIMG1 is input to the controller 10 via the one or more input(s) 14. The connection between the controller 10 and each of the first, second and third imaging devices C1, C2, C3 could be a wired connection or a wireless connection. For example, the first, second and third imaging devices C1, C2, C3 may be connected to the controller 10 over a vehicle communication network, such as an Ethernet/Broad® Reach connection or an uncompressed serialised video connection. In use, the first, second and third image data DIMG1, DIMG3, DIMG3 is input to the controller 10. The controller 10 is configured to combine at least a portion of each of the first, second and third images IMG1, IMG2, IMG3 to generate the composite image IMGCOM.

It will be appreciated that various changes and modifications can be made to the present invention without departing from the scope of the present application.

The control system 1 has been described herein as generating the composite image IMGCOM in dependence on the hitch angle α. Alternatively, or in addition, the control system 1 may be configured to generate the composite image IMGCOM in dependence on a steering angle β of the towing vehicle V1. The steering angle β may, for example, be output by a steering angle sensor 8 associated with a steering wheel of the towing vehicle V1. As shown in FIG. 2, the steering angle sensor 8 may output a steering angle signal SIN6 to the control system 1. The steering angle signal SIN6 comprises steering angle data captured by the steering angle sensor 8. The width WL, WR of the left and right viewports VPL, VPR may be dynamically adjusted in dependence on the steering angle β. It will be understood that the control system 1 could be used with or without a towed vehicle V2. The first sub-image data may be selected to increase the prominence of the left viewport VPL relative to the right viewport VPR when the steering angle data indicates a travel direction towards the left hand side of the vehicle V1. The second sub-image data may be selected to increase the prominence of the right viewport VPR relative to the left viewport VPL when the steering angle data indicates a travel direction towards the right hand side of the vehicle V1. The control system 1 may be configured to form the composite image IMGCOM from one or more imaging devices Cn having a forward-facing orientation. For example, the first and second imaging devices C1, C2 may be mounted in the first and second side housings 4-1, 4-2 such that the first and second fields of view FOV1, FOV2 project forwards. Other mounting positions are contemplated for the first and second imaging devices C1, C2. The third imaging device C3 may be mounted in a central location, for example in a grille or a front bumper of the vehicle V1. Alternatively, the third imaging device C3 may be mounted in front of the rear view mirror. In a further variant, the third imaging device C3 may be mounted on an underside of the vehicle V1 to capture an image comprising the ground beneath the vehicle V1. For example, the third imaging device C3 may be mounted below the engine compartment. The control system 1 may be configured to operate when the vehicle V1 is travelling forwards and/or backwards.

The control system 1 may receive image data from one or more forward facing imaging devices Cn disposed on a towed vehicle V2. For example, the control system 1 may receive an image which includes at least a portion of the towing vehicle V1. The composite image IMGCOM may facilitate identification of an obstacle(s) alongside the towing vehicle V1.

Figure 10:
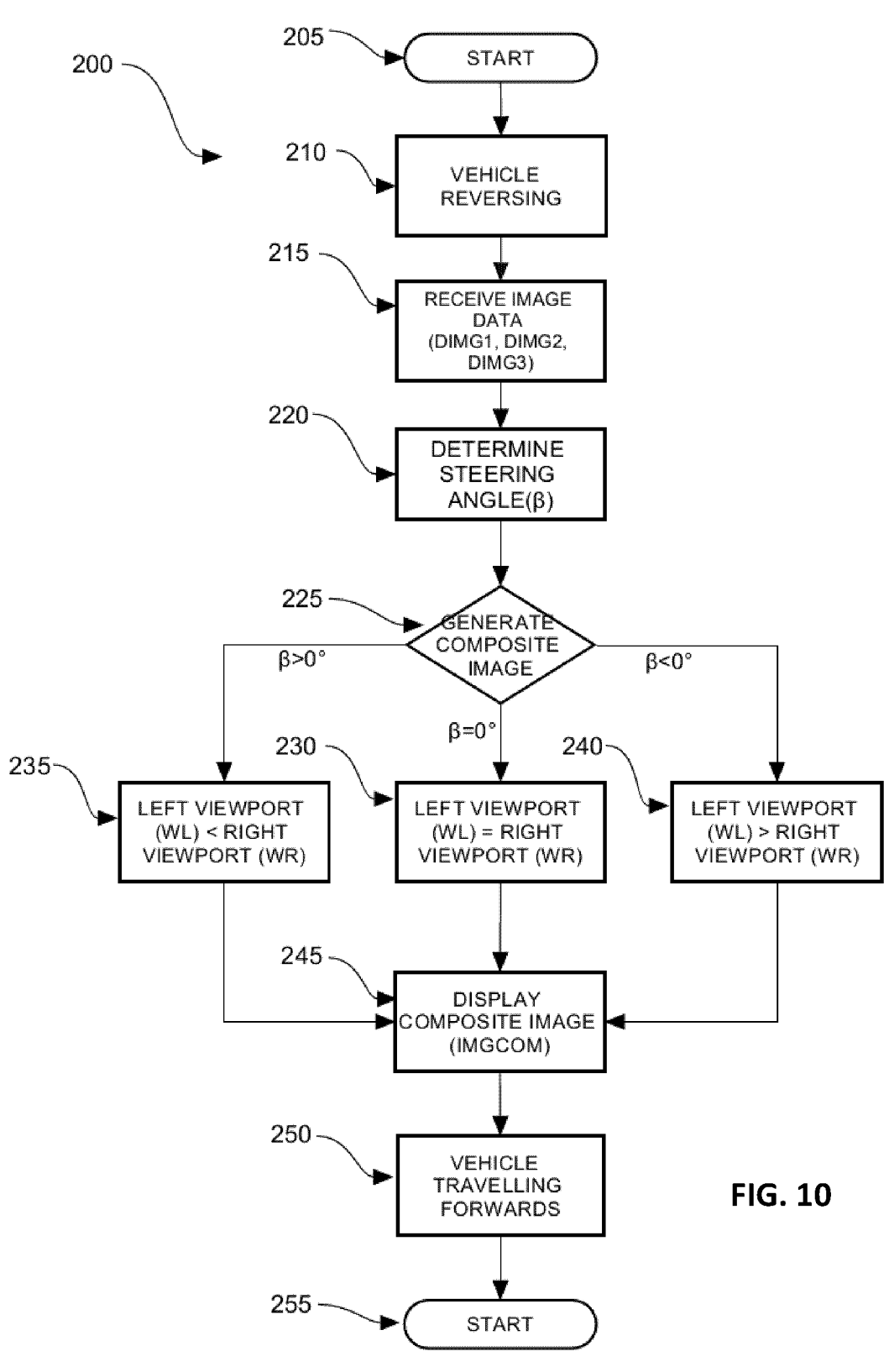
FIG. 10 shows a block diagram representing operation of the control system according to a further embodiment of the present invention.

The operation of the control system 1 will now be described with reference to the block diagram 200 shown in FIG. 10. The control system 1 is activated (BLOCK 205). The control system 1 receives the transmission signal SIN5 from the transmission control unit 7 and determines that the towing vehicle V1 is in reverse (BLOCK 210). The control system 1 receives the first, second and third image data DIMG1, DIMG2, DIMG3 from the respective first, second and third imaging devices C1, C2, C3 (BLOCK 215). The control system 1 receives the steering angle signal SIN6 from the steering angle sensor 8 and determines the steering angle (BLOCK 220). The control system 1 selects the first and second image data subsets in dependence on the determined steering angle β. The control system 1 generates the composite image IMGCOM in dependence on the determined hitch angle α (BLOCK 225). The composite image IMGCOM comprises the centre viewport VPC, the left viewport VPL and the right viewport VPR. If the steering angle β is zero degrees (0°), the composite image IMGCOM is generated such that the left viewport VPL and the right viewport VPR have substantially the same width (BLOCK 230). If the steering angle β is greater than zero degrees (α>0°), the composite image IMGCOM is generated such that the width WL of the left viewport VPL is less than the width WR of the right viewport VPR (BLOCK 235). If the steering angle is less than zero degrees (α<0°), the composite image IMGCOM is generated such that the width (WL) of the left viewport VPL is greater than the width (WR) of the right viewport VPR (BLOCK 240). The control system 1 is configured to generate the composite image IMGCOM at least substantially in real time. The composite image IMGCOM is modified dynamically in dependence on changes in the steering angle β. The composite image IMGCOM is output to the display 7 (BLOCK 245). The control system 1 continues to generate the composite image IMGCOM while the towing vehicle V1 is in reverse. The control system 1 receives a transmission signal SIN5 from the transmission control unit 7 indicating that a forward gear is selected and that the towing vehicle V1 is travelling forwards (BLOCK 250). The process then ends (BLOCK 255).

In a further variant, the composite image IMGCOM could be formed by compositing the first and second images IMG1, IMG2 captured by the first and second imaging devices C1, C2 provided on the towing vehicle V1 with an image from an imaging device (not shown) disposed on the towed vehicle V2. For example, the third imaging device C3 may be disposed on the towed vehicle V2. The third imaging device C3 may, for example, be mounted on the towed vehicle V2 with a third field of view FOV3 oriented in a rearward direction. The composite image IMGCOM may be formed by compositing the first, second and third images IMG1, IMG2, IMG3. The composite image IMGCOM may, for example, comprise part or all of at least one of the first, second and third images IMG1, IMG2, IMG3.

In a still further variant, the controller 10 may receive image data from a fourth imaging device (not shown) configured to capture a fourth image. The fourth imaging device may, for example, be disposed in an elevated position on the towing vehicle V1, for example mounted on a roof of the towing vehicle V1 or incorporated into an antenna (such as a roof-mounted antenna) provided on the towing vehicle V1. The composite image IMGCOM may be formed by compositing the first, second, third and fourth images. The composite image IMGCOM may, for example, comprise part or all of at least one of the first, second, third and fourth images. The component of the composite image IMGCOM formed by the fourth image may comprise a fixed viewport, for example having a fixed (non-variable) viewing angle. The fourth image may be displayed above or below the portion of the composite image IMGCOM formed by compositing the first, second and third images IMG1, IMG2, IMG3. The fourth image may, for example, have a landscape composition. The composite image IMGCOM is output to the display screen 5 which may, for example, be provided in a rear view mirror.

In a still further variant, the left and right viewports VPL, VPR may be adjusted dynamically without forming the composite image IMGCOM. For example, the left and right viewports VPL, VPR may be output to respective display screens (not shown) or to the display screen 5. The left and right viewports VPL, VPR may be displayed without the centre viewport VPC. The width of the left and right viewports VPL, VPR may be adjusted dynamically using the techniques described herein, for example in dependence on the hitch angle α and/or the steering angle β.

The first and second imaging devices C1, C2 have been described herein as being mounted in the first and second side housings 4-1, 4-2. The first and second side housings 4-1, 4-2 may optionally each comprise a side mirror. Alternatively, the first and second side housings 4-1, 4-2 may be dedicated assemblies for the first and second imaging devices C1, C2.

In a still further variant, the left and right viewports VPL, VPR may be selected from the same image. The third imaging device C3 may comprise a wide-angle lens. The first and second images IMG1, IMG2 may be selected from the image captured by the third imaging device C3.

The control system 1 described could be modified to generate a composite image IMGCOM which provides a birds-eye (plan elevation) view of a region around the towing vehicle V1 and/or the towed vehicle V2. The birds-eye view image may be generated by applying a suitable transform to each of the images IMG1, IMG2 . . . IMGn and using an appropriate stitching technique to combine the images. The techniques described herein may be used dynamically to modify the composition of the composite image IMGCOM, for example selectively to increase and decrease the prominence of left and right viewports VPL, VPR in dependence on the hitch angle α and/or the steering angle β. Alternatively, or in addition, the composite image IMGCOM may be modified dynamically to adjust the extent of a front viewport (disposed in front of the vehicle V1, V2) and/or a rear viewport (disposed behind the vehicle V1, V2) in dependence on a direction of travel of the vehicle V1, V2. For example, the prominence of the front viewport may be increased when the vehicle V1, V2 is travelling forwards; and the prominence of the rear viewport may be increased when the towing vehicle V1 is travelling backwards. The control system 1 could receive image data from additional imaging devices Cn. For example, three (3) imaging devices Cn may be provided on the towed vehicle V2. For example, at least one imaging device Cn may be provided on each side of towed vehicle V2; and optionally an imaging device Cn may be provided at the rear of the towed vehicle V2.

The invention claimed is:

1. A control system for providing assistance to an occupant of a towing vehicle, the control system comprising one or more controllers, the control system configured to:

receive hitch angle data indicative of a hitch angle of a towed vehicle coupled to the towing vehicle via an articulated coupling, wherein the towing vehicle has a first longitudinal axis and the towed vehicle has a second longitudinal axis, wherein the hitch angle defines an angular orientation of the second longitudinal axis relative to the first longitudinal axis, and wherein when the hitch angle data indicates the hitch angle is zero, the first longitudinal axis is aligned with the second longitudinal axis, when the hitch angle data indicates the hitch angle is within a first range of angles, the towed vehicle is oriented to project outwardly, from the articulated coupling to a rear of the towed vehicle, on a first side of the towing vehicle, when viewed from a rear of the towing vehicle, and when the hitch angle data indicates the hitch angle is within a second range of angles, the towed vehicle is oriented to project outwardly, from the articulated coupling to the rear of the towing vehicle, on a second side of the towing vehicle, when viewed from the rear of the towing vehicle;

select first and second image data subsets of at least first image data, the first image data subset representing a first viewport on the first side of the towing vehicle captured with a first imaging device disposed on the first side of the towing vehicle and the second image data subset representing a second viewport on the second side of the towing vehicle captured with a second imaging device disposed on the second side of the towing vehicle; and output a signal indicative of the first image data subset and the second image data subset to at least one display for displaying the first viewport and the second viewport to the occupant of the towing vehicle;

wherein the control system is configured to select the first image data subset and the second image data subset in dependence on the hitch angle data; the first image data subset being selected to increase the prominence of the first viewport relative to the second viewport when the hitch angle data indicates that the hitch angle is within the first range of angles; and the second image data subset being selected to increase the prominence of the second viewport relative to the first viewport when the hitch angle data indicates that the hitch angle is within the second range of angles; and wherein increasing the prominence of the first viewport comprises increasing the size of the first viewport relative to the second viewport; and/or increasing the prominence of the second viewport comprises increasing the size of the second viewport relative to the first viewport.

2. A control system as claimed in claim 1, wherein the first imaging device captures a first image on the first side of the towing vehicle and the first viewport is generated by extracting the first image data subset from the first image.

3. A control system as claimed in claim 1, wherein the second imaging device captures a second image on the second side of the towing vehicle and the second viewport is generated by extracting the second image data subset from the second image.

4. A control system as claimed in claim 1, wherein increasing the size of the first viewport comprises increasing a width of the first viewport; and increasing the size of the second viewport comprises increasing a width of the second viewport.

5. A vehicle comprising a control system as claimed in claim 1.

6. A control system as claimed in claim 1, wherein the first side is a right side of the towing vehicle, the first range of angles includes angles greater than zero, the second side is a left side of the towing vehicle, and the second range of angles includes angles less than zero.

7. A control system for providing assistance to an occupant of a vehicle, the control system comprising one or more controllers, the control system configured to:

receive steering angle data indicative of a steering angle of the vehicle;

select first and second image data subsets of at least first image data, the first image data subset representing a first viewport on a first side of the vehicle and the second image data subset representing a second viewport on a second side of the vehicle, wherein the first viewport comprises or consists of the first image data subset, the first image data subset being captured by a first imaging device disposed on the first side of the vehicle and wherein the second viewport comprises or consists of the second image data subset, the second image data subset being captured by a second imaging device disposed on the second side of the vehicle; and output a signal indicative of the first image data subset and the second image data subset to at least one display for displaying the first viewport and the second viewport to the occupant of the vehicle;

wherein the control system is configured to select the first image data subset and the second image data subset in dependence on the steering angle data; the first image data subset being selected to increase the prominence of the first viewport relative to the second viewport when the steering angle data indicates a travel direction towards the first viewport on the first side of the vehicle; and the second image data subset being selected to increase the prominence of the second viewport relative to the first viewport when the steering angle data indicates a travel direction towards the second viewport on the second side of the vehicle; and wherein increasing the prominence of the first viewport comprises increasing the size of the first viewport relative to the second viewport; and/or increasing the prominence of the second viewport comprises increasing the size of the second viewport relative to the first viewport.

8. A method of providing assistance to an occupant of a towing vehicle, the method comprising:

determining that a hitch angle of a towed vehicle coupled to the towing vehicle via an articulated coupling is in a first range of angles, wherein the towing vehicle has a first longitudinal axis and the towed vehicle has a second longitudinal axis, wherein the hitch angle defines an angular orientation of the second longitudinal axis relative to the first longitudinal axis, and wherein when the hitch angle is zero, the first longitudinal axis is aligned with the second longitudinal axis and when the hitch angle is in the first range of angles, a rear of the towed vehicle, when viewed from above, is displaced in a clockwise direction relative to a position of the rear of the towed vehicle when the hitch angle is zero;

responsive to determining that the hitch angle is in the first range of angles:

selecting a first viewport on a first side of the towing vehicle and a second viewport on a second side of the towing vehicle, opposite the first side, wherein the first viewport comprises or consists of a portion of a first image, the first image being captured by a first imaging device disposed on the first side of the towing vehicle and wherein the second viewport comprises or consists of a portion of a second image, the second image being captured by a second imaging device disposed on the second side of the towing vehicle; and displaying the first viewport and the second viewport to the occupant of the towing vehicle, wherein the first and second viewports are selected in dependence on the determined hitch angle such that the prominence of the first viewport is increased relative to the second viewport responsive to the determined hitch angle being in the first range of angles;

determining that the hitch angle is in a second range of angles, wherein when the hitch angle is in the second range of angles, the rear of the towed vehicle, when viewed from above, is displaced in a counterclockwise direction relative to the position of the rear of the towed vehicle when the hitch angle is zero;

responsive to determining that the hitch angle is in the second range of angles:

selecting the first viewport on the first side of the towing vehicle and the second viewport on the second side of the towing vehicle; and displaying the first viewport and the second viewport to the occupant of the towing vehicle, wherein the first and second viewports are selected in dependence on the hitch angle such that the prominence of the second viewport is increased relative to the first viewport responsive to the determined hitch angle being in the second range of angles; and wherein increasing the prominence of the first viewport comprises increasing the size of the first viewport relative to the second viewport; and increasing the prominence of the second viewport comprises increasing the size of the second viewport relative to the first viewport.

9. A method as claimed in claim 8, wherein the first viewport comprises or consists of a portion of a first image, the first image being captured by a first imaging device disposed on a first side of the towing vehicle.

10. A method as claimed in claim 8, wherein the second viewport comprises or consists of a portion of a second image, the second image being captured by a second imaging device disposed on a second side of the towing vehicle.

11. A method as claimed in claim 8, wherein the first and second viewports are both selected from a first image.

12. A method as claimed in claim 8, wherein increasing the size of the first viewport comprises increasing a width of the first viewport; and increasing the size of the second viewport comprises increasing a width of the second viewport.

13. A non-transitory, computer-readable storage medium storing instructions thereon that, when executed by one or more electronic processors, causes the one or more electronic processors to carry out the method of claim 9.

\* \* \* \* \*